Feb. 5, 1952

W. K. HODDER ET AL 2,584,268

TELEVISION SWEEP CIRCUITS

Filed June 16, 1949

2 SHEETS—SHEET 1

Inventor
WAYNE K. HODDER
LOUIS L. POURCIAU
RICHARD W. LEE

By H. S. Mackey
Attorney

TELEVISION SWEEP CIRCUITS

Filed June 16, 1949 2 SHEETS--SHEET 2

Inventor
WAYNE K. HODDER
LOUIS L. POURCIAU
RICHARD W. LEE

By
H. S. Mackey
Attorney

Patented Feb. 5, 1952

2,584,268

UNITED STATES PATENT OFFICE 2,584,268

TELEVISION SWEEP CIRCUITS

Wayne K. Hodder, Pasadena, Calif., and Louis L. Pourciau and Richard W. Lee, Pleasantville, N. Y., assignors to General Precision Laboratory Incorporated, a corporation of New York Application June 16, 1949, Serial No. 99,508

3 Claims. (Cl. 315—27)

This invention pertains to television sweep circuits and more particularly to vertical and horizontal sweep-generating circuits having improved linearity.

In television pickup tubes and display tubes a beam of electrons scans or sweeps a screen surface in successive horizontal lines to either generate electrical signals representative of a light image in the case of a pickup tube or to illuminate the screen in varying degrees of brightness in the case of a display tube.

As is well known in the art, the electron beams of the pickup and display tubes are caused to scan the entire area of a suitable screen in a succession of horizontal lines under the combined action of horizontal and vertical deflection means, the relative rates of the horizontal and vertical deflection means being such that a beam moves from left to right 262½ times while it is progressing from top to bottom of the screen and caused to retrace once in 1/60 second.

Obviously in order that the picture depicted on the display tube accurately agree with that projected on the pickup tube, the position of the electron beam on the screen of the display tube must at every instant of time correspond to the position of the electron beam on the screen of the pickup tube. The start of each horizontal and each vertical sweep of the electron beam of the display tube is made to coincide with the start of the corresponding sweep of the electron beam of the pickup tube by suitable synchronizing pulses interspersed with the picture signals.

Mere synchronization of the start of these sweeps, however, does not completely solve the problem as coincides of position of the beams on the respective screens may be lost if the relative speed of travel thereover varies after the start of any selected deflection. As a practical matter similarity of speed of travel of the respective electron beams over the surface of their respective screens must be secured by making the beams sweep over the surface of the screens at a constant rate horizontally and at a constant rate vertically.

To provide a constant rate of sweep of the beams over the surface of the respective screens the electron beam deflecting means is energized by sawtooth wave forms, the vertical side of the sawtooth wave corresponding to the time of retrace of the beam across the screen and the slanting side corresponding to the time of scanning the screen surface.

In general practice the sawtooth wave forms which are used to energize the deflecting means of the display tube at the receiver are generated by a series resistance-capacitance circuit periodically triggered by vertical and horizontal synchronizing pulses, the vertical side of the wave form being produced at the instant of reception of the triggering pulse and the slanting side being produced by the recovery of the condenser. The recovery of the condenser, however, follows an exponential law and in general the time constant of the resistance-capacity circuits used is such a small multiple of the period of the energizing pulses that the exponential curvature is present in the slanting side of the sawtooth. The speed of travel of the sweep of the electron beam over its screen, therefore, is by no means linear and the picture depicted on a display tube appears to be crowded at the bottom and at its right edge.

In order to correct this improper action it has been customary to introduce a curvature in the opposite sense in amplifying the sawtooth wave form by the use of a succeeding tube the dynamic transfer function of which increases as its input increases. This practice, however, corrects one fault by adding another leading to a multiplicity of controls. In some cases there are as many as seven controls which affect linearity, since the adjustment of the amplitude control requires readjustment of linearity.

The present invention avoids these difficulties by generating a sawtooth wave form which is truly linear and maintaining the linearity thereof through its various stages of amplification.

This is accomplished by utilizing a sawtooth generating circuit whose time constant is exceedingly long compared to the period between energizing pulses so that only the first small essentially straight portion of the recovery curve of the condenser is used as the sawtooth wave generating means.

Additionally this linear sawtooth wave form after having been generated is maintained in such linear condition by the use of an amplifier having a negative feedback loop such that any tendency toward departure in linearity is automatically corrected.

Thus the instant invention provides improved linearity and stability and at the same time greatly reduces the number of operating controls making operation much simpler.

The nature of this invention is more fully described in the following detailed description accompanied by the drawing in which.

Figure 1:
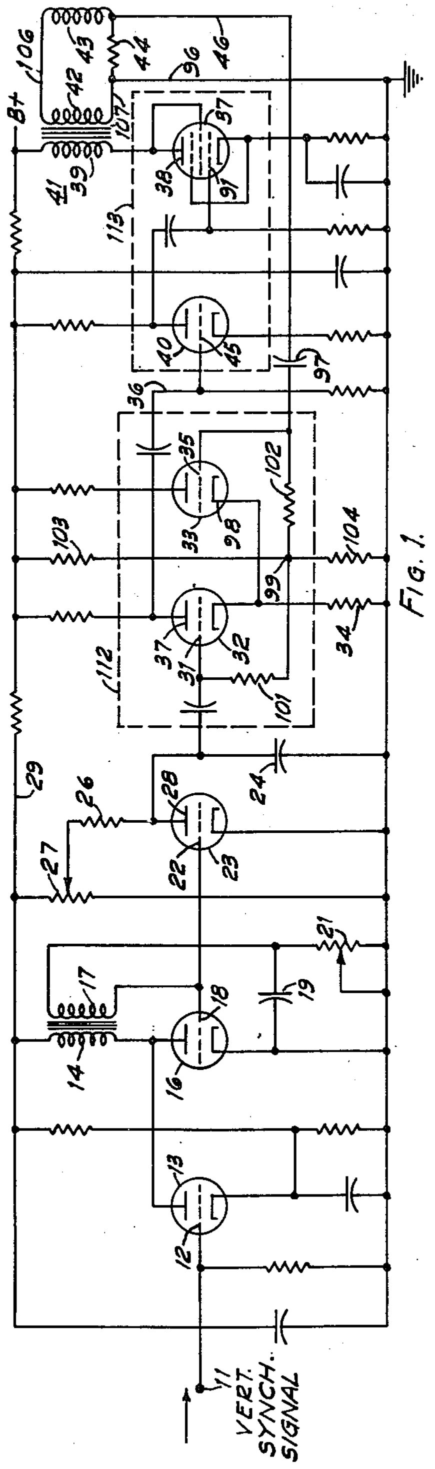
Fig. 1 is a schematic illustration of a vertical sweep circuit embodying the invention.

Referring to Fig. 1, sharp triggering pulses derived from vertical synchronizing signals received from a television transmitting station and segregated by a television receiver are impressed on the terminal 11. These sharp pulses constitute the input signal for triggering the vertical sweep circuit, are of short duration, and occur every 1/60 second as illustrated at A in Fig. 3. These pulses are impressed on the grid 12 of a pulse amplifier tube 13, the plate current of which flows through one winding 14 of a pulse transformer. The transformer is connected into the plate and grid circuit of another tube 16 in such a manner that the tube and its associated circuits constitute a blocking oscillator.

A positive current pulse in the winding 14 induces a sharp potential surge in the winding 17 which increases the potential of the grid 18 of the tube 16 so that its plate current increases, reinforcing the effect of the input pulse. Upon decay of the primary current the secondary potential is reversed and becomes lower than ground potential, applying a corresponding negative charge to the condenser 19. The condenser 19 slowly recovers toward ground potential under control of the RC timing circuit consisting of the condenser 19 and the adjustable resistor 21, and in doing so controls the potential of the grid 18 accordingly. The adjustment of this "hold control" resistor 21 once made, need not be changed; it permits restoration of the charge of the condenser 19 nearly to zero within the 1/60 second sweep period. These grid potential changes are depicted at B in Fig. 3.

The grid 18 of tube 16 is connected to the grid 22 of another tube 23, so that the potential changes of the grid 18 are impressed on the latter tube. The tube 23 amplifies the potential wave form illustrated in Fig. 3 at B and utilizes the initially rising portion thereof to excite the vertical sweep timing circuit. The vertical sweep timing circuit consists of the capacitor 24 in series with the resistor 26 and the potentiometer 27. The anode 28 of the tube 23 together with the connected plate of the condenser 24 are statically at a positive potential nearly as high as that of the +B bus 29 and dynamically at some lower potential controlled by the setting of the potentiometer 27, which acts to control the vertical sweep amplitude and thereby the vertical size of the picture. Upon positive energization of the grid 22 the tube 23 draws current, partly discharging the condenser 24 to near ground potential. Upon energization of the grid 22 negatively, the anode current stops and the condenser 24 commences recharging through the resistor 26 and potentiometer 27 towards its static potential at an exponential rate controlled by its RC time constant. This discharge-charge cycle is illustrated at C in Fig. 3 and constitutes the sawtooth sweep wave form for controlling the vertical sweep and vertical retrace of the cathode ray in the video tube. The vertical portion of curve C controls the retrace of the cathode ray and the slanting portion controls the vertical sweep during formation of the image on the tube's fluorescent screen. The wave form C is illustrated as having its slanting portion comprising a straight line rather than an exponential recovery curve, since in the instant invention the time constant of the resistance-capacity circuit consisting of the condenser 24, resistor 26, and potentiometer 27 is on the order of 30 times the period of the vertical pulses, and the recovery curve of the condenser 24 is therefore drawn out to such a length that the small portion thereof depicted as occurring within the space of 1/60 second is virtually a straight line, appears so when inspected by an oscillograph and accordingly is so drawn.

This sawtooth voltage is impressed on the control electrode 31 of a tube 32 which with another similar tube 33 constitutes a cathode-coupled differential amplifier 112. The control electrodes 31 and 35 are connected to a low positive bias potential at a junction 99 through two equal resistors 101 and 102 respectively, so that the tubes have equal bias of such amount as to cause them to operate alike and on a straight portion of their characteristic curve. The potential of the junction 99 is secured by making it an intermediate point of a potential divider composed of two resistors 103 and 104 in series connected between a source of positive potential and ground. The cathode resistor 34 is common to the two tubes 32 and 33 so that signals of opposite sense or unequal signals of the same sense applied to the control electrodes 31 and 35 have great effect in producing a signal in the output conductor 36 connected to the anode 37, but equal signals or like sense simultaneously applied to the two control electrodes practically cancel each other in their effect at the output conductor 36. Since these tubes are operated on the straight portions of their characteristic curves, the output potential signal at the conductor 36 duplicates and inverts the sawtooth of wave form C, Fig. 3, and is proportional to the difference of the signal magnitudes on the electrodes 31 and 35. The differential output potential is indicated by the wave form D in Fig. 3.

This differential output potential is impressed through conductor 36 on a high gain two-stage amplifier 113 employing a tube 40 in its first stage and a pentode 37 in its final stage. Since each stage inverts the phase, the output potential of pentode 37 is of the same form and phase as the input potential illustrated at D, Fig. 3. The load on the pentode 37 consists of the primary winding 39 of an impedance-matching transformer 41, and the potential drop through this primary being opposite in phase to the accompanying current flow, the current flow has a sawtooth form which is similar to the curve D inverted and is depicted by the curve E. Since it is characteristic of pentodes that the anode current and not the anode potential faithfully follows the variations of control grid potential, the current flow through the transformer winding 39 will be a faithful copy in form of the potential impressed on the grid 31 of tube 32, as at C, Fig. 3.

A secondary winding 42 of the transformer 41 is connected to a deflection winding 43 on a cathode ray tube (not shown). The deflection of such a tube is proportional to the ampere turns in its electromagnetic deflection winding and this in turn is proportional to the current delivered to the coil 43 by the transformer secondary winding 42. The deflection of the ray is thus proportional to the potential input at the grid 31 of the differential amplifier 112, and has the form shown at E in Fig. 3.

The linearity of the current in the video tube deflection coil 43 with respect to the input potential at the grid 31 of the differential amplifier 112 is subject to wide fluctuations, varying with the gain of the amplifier 113 and the magnitude of the signal, and is affected by ageing of the tubes and thermal effects. Therefore, a portion of the current flowing in the coil 43 is fed back to the differential amplifier 112 in a negative or degenerative sense, which for all practical purposes completely eliminates all non-linear effects in a manner which will be explained hereinafter.

To accomplish this purpose a low resistance 44 is inserted in series with vertical deflection coil 43 so that current flowing in the vertical deflection coil 43 also flows in the resistor 44. Two conductors 46 and 96 are connected to the two terminals of the resistor 44 so that the potential drop in the resistor 44, representative of the current therein, exists between the conductors 46 and 96. The conductor 46 is coupled through a condenser 97 to the control grid 35 of the tube 33 of the differential amplifier 112, and the other conductor 96 is connected through the cathode resistor 34 to the cathode 98 of the same tube 33, so that any potentials which may exist across the resistor 44 are impressed between the grid 35 and cathode 98 of the tube 33.

The conductors 46 and 96 complete a closed loop by which degenerative or negative feedback around the amplifier 113 is accomplished. This closed loop is composed of the following principal elements: a subtracting device consisting of the differential amplifier 112, a very high gain amplifier 113, the feedback path including the conductors 46 and 96, and a power-dividing device including the resistor 44 to control the amount of output energy that is fed back.

Such an arrangement insures the linearity of the output sawtooth wave form in the following manner: bearing in mind that the sawtooth wave form constituting the primary input to the differential amplifier 112 is made to have true linearity of its sloping side by the use of a resistance-capacity circuit whose time constant is great compared with the time interval between successive synchronizing pulses, departure from such linearity can only result by reason of non-linear action occurring in the succeeding amplifier circuits. Thus if linearity is assured in these amplifier circuits, the wave form impressed on the deflection circuits must also be linear.

Assume, for example, that for any of a number of reasons the amplifier circuits 112 and 113 tend to have characteristics such that although the primary input signal is a sawtooth wave form whose sloping side is truly linear, the output wave form tends to have a drooping characteristic. That is to say, at the higher amplitudes the output signal is increasing less than it should be for a constant slope sawtooth wave form. In such an event the signal obtained from the resistor 44, fed back to the input of the amplifier 112 and subtracted from the truly linear primary input signal to constitute a difference input signal of the amplifier 112 has the same drooping characteristic. Inasmuch as the primary signal is truly linear the difference signal increases at the higher amplitudes and therefore the difference input signal is made to have a characteristic which compensates for any undesirable action of the amplifier circuits.

Where, of course, the amplifier 113 is of extremely high gain and nearly all of the output signal is fed back to the input the corrective action is more pronounced.

Figure 4:
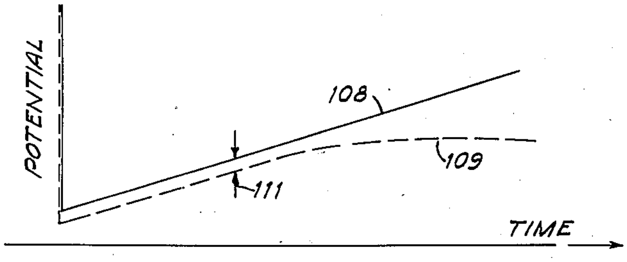

In order to illustrate the action of negative or degenerative feedback in forcing the output wave form to simulate the input wave form with great exactness, there is depicted in Fig. 4 a full-line graph 108 representing a sawtooth shaped input potential pulse applied to the input control grid 31 of the tube 32. The dashed line 109 represents feedback potential applied to the grid 35 of the tube 33. The feedback potential 109 being applied in a degenerative sense is of the same polarity as the signal potential 108 but is slightly less in amount so that the net signal applied to the amplifier through the conductor 36 is the difference of the two and is represented by the distance 111 between the two curves 108 and 109. Now let it be supposed that although the input signal 108 remains a straight line, internal non-linearities make the feedback signal potential curve 109 tend to bend downward. But this increases the difference 111 and thus increases the output signal which is proportional to the difference between the two curves. This in turn increases the feedback, restoring the curve 109 approximately to the position which it would have assumed in the absence of the cause of non-linearity, and the greater the gain of the amplifier, the more closely the curve is constrained to follow a course which is linear in relation to the input signal.

Thus the introduction of degenerative current feedback forces the sweep coil current in the instant invention to be closely representative at every point in its path of the corresponding points of the sawtooth potential. Virtually perfect linearity of the vertical sweep is attained automatically so that manually adjustable linearity controls for manipulation during operation of the equipment are not required and are omitted from the circuit. An additional advantageous result is that changes with time within the circuit of the feedback loop are automatically compensated for by the action of the negative feedback, constituting a great improvement in the stability of correct operation during any period of time over previously-known circuits.

Figure 2:
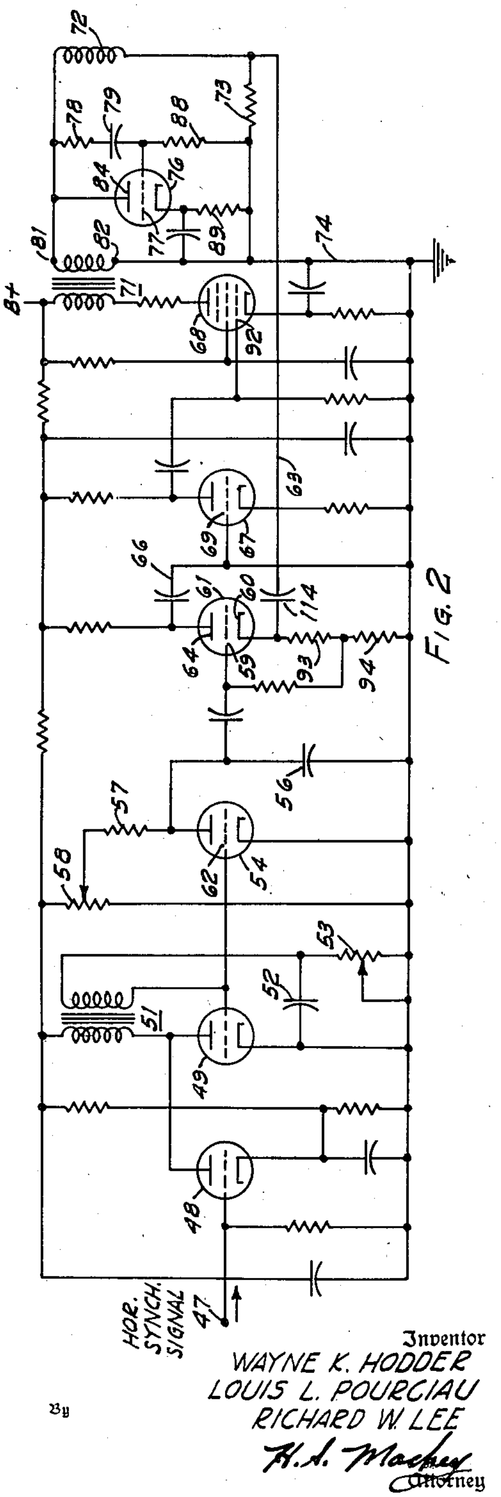
Fig. 2 is a schematic illustration of a horizontal sweep circuit embodying the invention.

In Fig. 2 the horizontal synchronizing signals are received from the television receiving circuits at an input terminal 47, and energize a horizontal sweep circuit in general similar to the above-described vertical sweep circuit. An input signal amplifying tube 48 energized by the horizontal synchronizing signals triggers a blocking oscillator comprising the tube 49 and pulse transformer 51. The secondary thereof is grounded through an adjustable hold control circuit comprising the condenser 52 and resistor 53 and the output pulse after amplification by the tube 54, is applied to a sweep-timing circuit comprising a condenser 56, resistor 57 and potentiometer 58 for adjusting amplitude.

The resulting sawtooth potential is applied to the control grid 59 of a tube 61. So far the circuit is identical, except for sizes of components, with the first part of the vertical sweep circuit, and the potentials at the terminal 47, grid 62 and grid 59 are represented by the wave forms A, B, and C respectively of Fig. 3 except that the period is $^1/_{15,750}$ second instead of $^1/_{60}$ second, so that the operation of the two circuits is similar and therefore the description given of the vertical sweep circuit operation need not be repeated.

In the horizontal sweep circuit, a negative feedback conductor 63 is connected to the cathode 60 of the tube 61, which therefore amplifies approximately in proportion to the difference between the potentials applied to the grid 59 and the cathode 60. This one tube thus serves as a differential amplifier and is the subtracting device of a degenerative feedback loop.

The differential output potential of the differential amplifier triode 61 is taken from its anode 64 through the conductor 66 and is amplified by the tube 67 and pentode 68, so that the plate current of the latter is representative of the potential applied to the grid 59 of the tube 61. This current is transformed by the impedance-matching transformer 71 and applied to the horizontal deflection coil 72 of a cathode ray picture tube (not shown). The potential at the output conductor 66 of the differential amplifier 61 is represented by the wave form D of Fig. 3, and the current in the horizontal deflection coil is represented by the wave form E of Fig. 3 except that the period is $^1/_{15,750}$ second. The potential difference generated by this current across a small series resistor 73 is fed back to the differential amplifier tube 61 through the ground connection 74 and the conductor 63 in series with a coupling condenser 114, so that this potential difference, proportional at each instant to the horizontal sweep deflection coil current, appears across the cathode resistance of the tube 61 consisting of the two resistors 93 and 94 in series. These connections complete a feedback loop, and have such polarity that the instantaneous sense of the fed back pulse of potential applied across the cathode resistance is the same as that of the input signal which caused it. For example, a positive signal pulse on the grid 59 results in a fed back potential which increases the positive potential of the cathode 60, so that the bias of the tube is changed by only the amount of the difference in magnitude between the input signal and the fed back signal.

The closed feedback loop contains these principal components: the differential amplifier tube 61, a very high gain amplifier including the tubes 67 and 68, a negative or degenerative feedback connection including the conductors 63 and 74, and a feedback signal energy divider including the resistor 73. These components are the same as those composing a similar negative feedback circuit in the vertical sweep circuit except that here the differential amplifier consists of a single tube instead of two tubes because, at the higher horizontal sweep frequency, the input impedance which the cathode resistance 93 and 94 represents to the feedback signal can be easily matched by the impedance of the feedback conductors including the coupling condenser 114. This is not the case in the vertical sweep circuit. The degenerative feedback operation of the horizontal sweep circuit is similar to that of the vertical sweep circuit so that repetition of the detailed description of operation given in connection with the latter would be superfluous.

Since the pulse frequency is much higher in the horizontal sweep circuit than in the vertical circuit, the inductive reactance of the former circuit is many times as great as in the latter. As a result it is apparent that the potential shape required to produce a sawtooth current output will have the form of a trapezoid with a slanting or sawtooth top. Another result of the high coil inductance is the impossibility of securing a fast enough retrace without the employment of special means, and a third outcome is the generation of several thousand volts due to rapid collapse of the coil field, against which components must be insulated and which requires provision for the rapid dissipation of large energy over short periods. These problems are met in the instant invention by the employment of a damper tube 76 shunted across the deflection coil with its grid so connected as to be triggered at the proper time, and by utilization of the natural period of the oscillatory circuit formed by the inductance and distributed capacitance of the horizontal deflection coil and connected equipment.

The control grid 77 of the tube 76 is connected to its plate through a low resistance 78 and series condenser 79. During a horizontal sweep both the transformer potential at the terminals 81, 82 and current in the coil circuit are shown by the wave form F, Fig. 3, and the potential required to produce this current has the wave form depicted at G, Fig. 3. This shape is produced by superimposing extremely sharp and intense negative surges generated by the tube 76 and coil 72 upon the sawtooth potential generated through the transformer 71 secondary winding in the following manner: At the end of the picture sweep, at time 83 of graph G the current is suddenly cut off and since the deflection circuit is highly inductive a high potential in the opposite direction is produced in accordance with the relation $$E=L\frac{di}{dt}$$

Figure 3:
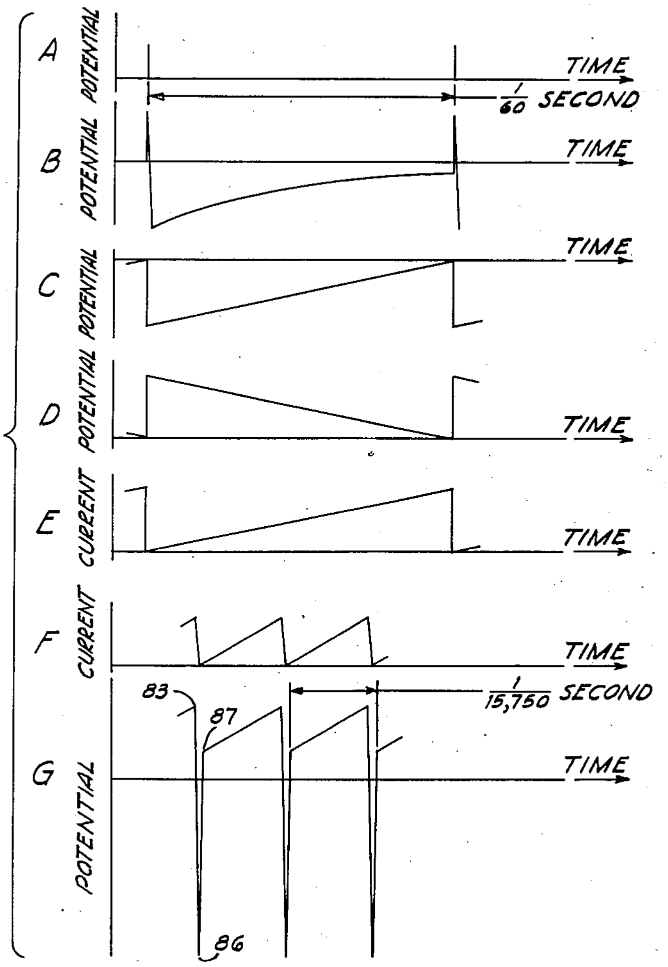
Figs. 3 and 4 are illustrations of various wave forms used in explaining the operation of the invention.

The circuit is so arranged that the anode 84 of the tube 76 is connected to that terminal 81 which is negative during this reverse surge, and therefore no current flows through the tube 76 and its grid is charged highly negatively. The reversal of the potential at the negative peak 86, Fig. 3, is timed by the natural period of the oscillatory circuit composed of the inductance of the coil 72 and the distributed capacitances associated therewith, but the oscillation is not permitted to continue indefinitely, for after one-half cycle of oscillation and during the oscillatory rise in potential from the point 86 to the point 87 that rise is impressed on a differentiating circuit composed of the condenser 79 and a resistor 88. The resulting high differentiated peak generated across this resistor 88 causes the control grid 77 to become highly biased positively, so that by the time the coil potential reaches the point 87 the tube 76 has become highly conductive and passes such a large current that the coil potential is prevented from rising above the point 87, the oscillatory energy is dissipated as heat in the tube 76 and the cathode resistor 89, and the coil oscillations are completely damped out. The coil is so designed that its half-period brings its potential to the point 87 in about 5 µs., adequate for retrace, and the circuit is ready for the next horizontal picture sweep. The differentiating circuit time constant is made very short, so that it is not affected by the potential rise during the picture sweep and during that time the grid 77 remains highly negative.

What is claimed is:

1. A linear sweep circuit for a television receiver comprising, a sawtooth signal wave generator including a resistance capacity circuit having a time constant greatly in excess of the period of recurrence of received synchronization signals, means for triggering said sawtooth generator in timed relation with received synchronization signals, a high gain amplifier, a deflection circuit energized by the output thereof and means for impressing a signal on the input of said amplifier whose instantaneous amplitude is represented by the difference between said sawtooth signal and a potential derived from said deflection circuit.

2. A linear sweep circuit for a television receiver comprising, a sawtooth signal wave generator including a resistance capacity circuit having a time constant greatly in excess of the period of recurrence of received synchronization signals, means for triggering said sawtooth generator in timed relation with received synchronization signals, a differential amplifier, a high gain amplifier energized by the output of said differential amplifier, a deflection circuit energized by the output of said high gain amplifier and circuit means for impressing the signal generated by said sawtooth signal generator and a signal derived from said deflection circuit on the input of said differential amplifier in opposed relation.

3. A linear sweep circuit for a television receiver comprising, a sawtooth signal wave generator including a resistance capacity circuit having a time constant greatly in excess of the period of recurrence of received synchronization signals, means for triggering said sawtooth signal generator in timed relation with the received synchronization signals, a vacuum tube amplifier including anode, cathode and control electrodes having its control electrode connected to the output of said sawtooth signal generator, a resistor connected between said cathode and ground, a high gain amplifier stage having its input coupled to the output of said vacuum tube amplifier and its output coupled to energize a deflection circuit and a degenerative feedback circuit interconnecting said deflection circuit and the cathode of said vacuum tube amplifier.

WAYNE K. HODDER.
LOUIS L. POURCIAU.
RICHARD W. LEE.

REFERENCES CITED

The following references are of record in the file of this patent:

UNITED STATES PATENTS

| Number | Name | Date |
| --- | --- | --- |
| 2,284,378 | Dome | May 26, 1942 |
| 2,309,672 | Schade | Feb. 2, 1943 |
| 2,414,546 | Nagel | Jan. 21, 1947 |
| 2,440,786 | Schade | May 4, 1948 |
| 2,495,696 | Cawein | Jan. 31, 1950 |